(12) United States Patent
Iida et al.

(10) Patent No.: US 10,602,570 B2
(45) Date of Patent: Mar. 24, 2020

(54) HEATING JACKET

(71) Applicant: NICHIAS CORPORATION, Tokyo (JP)

(72) Inventors: Kenji Iida, Tokyo (JP); Akira Sasaki, Tokyo (JP); Keiichi Fukuda, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 15/022,115

(22) PCT Filed: Sep. 3, 2014

(86) PCT No.: PCT/JP2014/004515
§ 371 (c)(1),
(2) Date: Mar. 15, 2016

(87) PCT Pub. No.: WO2015/045280
PCT Pub. Date: Apr. 2, 2015

(65) Prior Publication Data
US 2016/0278164 A1    Sep. 22, 2016

(30) Foreign Application Priority Data
Sep. 30, 2013 (JP) .................................. 2013-205694

(51) Int. Cl.
*H05B 3/56* (2006.01)
*H05B 3/58* (2006.01)
(Continued)

(52) U.S. Cl.
CPC .............. *H05B 3/565* (2013.01); *F16L 53/38* (2018.01); *H05B 3/34* (2013.01); *H05B 3/58* (2013.01)

(58) Field of Classification Search
CPC . H05B 3/565; H05B 3/58; H05B 3/34; H05B 3/342; H05B 3/345; H05B 3/347;
(Continued)

(56) References Cited

U.S. PATENT DOCUMENTS 3,953,566 A    4/1976  Gore
3,962,153 A    6/1976  Gore
(Continued)

FOREIGN PATENT DOCUMENTS

GB    2065430 A    6/1981
JP    51-18991    6/1976
(Continued)

OTHER PUBLICATIONS

Office action issued in corresponding Korean application 10-2016-7002564 dated May 19, 2017 (no translation available, submitted for certification).
(Continued)

*Primary Examiner* — Shawntina T Fuqua
(74) *Attorney, Agent, or Firm* — Nixon & Vanderhye P.C.

(57) ABSTRACT

A jacket heater placed in adjacent to an object to be heated so as to heat and keep warm said object, which comprises: a heating element, an outer covering member that envelops and accommodates the heating element, wherein the outer covering member is configured to comprise a first shaped body that is provided on a side thereof facing the object, and a second shaped body that is provided on a side opposite from said side facing the object, the second shaped body is a resin shaped body that has a porous structure, and the second shaped body has larger thickness than the first shaped body has. Provided is a jacket heater capable of efficiently keeping warm an object heated by this configuration.

8 Claims, 4 Drawing Sheets

(51) Int. Cl.
*F16L 53/38* (2018.01)
*H05B 3/34* (2006.01)

(58) Field of Classification Search
CPC .......... H05B 3/54; H05B 3/06; H05B 1/0288; H05B 2203/017; H05B 2203/036; H05B 2203/014; H05B 2203/003; H05B 2203/015; F16L 53/38; F16L 53/30; F16L 53/35; F16L 53/37
See application file for complete search history.

(56) References Cited

U.S. PATENT DOCUMENTS

| | | | |
|---|---|---|---|
| 4,096,227 A | 6/1978 | Gore | |
| 4,187,390 A | 2/1980 | Gore | |
| 5,381,511 A * | 1/1995 | Bahar | F16L 11/12 392/472 |
| 5,883,363 A * | 3/1999 | Motoyoshi | H05B 3/36 219/529 |
| 8,147,911 B2 | 4/2012 | Okuda et al. | |
| 8,592,725 B1 * | 11/2013 | Hunger | H05B 3/34 219/211 |
| 2004/0188419 A1 * | 9/2004 | Fukuda | H05B 3/34 219/549 |
| 2005/0067038 A1 | 3/2005 | Kobayashi et al. | |
| 2006/0141159 A1 | 6/2006 | Okuda et al. | |
| 2013/0062338 A1 | 3/2013 | Iida et al. | |

FOREIGN PATENT DOCUMENTS

| | | |
|---|---|---|
| JP | 61-113399 U | 7/1986 |
| JP | 1-14679 B2 | 3/1989 |
| JP | 05-154858 A | 6/1993 |
| JP | 07-249476 A | 9/1995 |
| JP | 11-159685 A | 6/1999 |
| JP | 11-176562 A | 7/1999 |
| JP | 2001-15254 A | 1/2001 |
| JP | 2004-303580 A | 10/2004 |
| JP | 2005-071930 A | 3/2005 |
| JP | 2005-188677 A | 7/2005 |
| KR | 2005-0031904 A | 4/2005 |
| KR | 10-1264588 B1 | 5/2013 |
| TW | 200502084 A | 1/2005 |
| WO | 2011/126051 A1 | 10/2011 |

OTHER PUBLICATIONS

English translation of the Written Opinion of the International Searching Authority issued in corresponding application PCT/JP2014/0045145 dated Apr. 5, 2016.

International Search Report issued in corresponding application PCT/JP2014/004515 completed on Nov. 11, 2014 and dated Nov. 18, 2014.

Office Action issued in related Taiwanese application 103131911 dated Aug. 25, 2016 (no translation available, submitted for certification).

* cited by examiner

HEATING JACKET

This is a National Phase Application in the United States of International Patent Application No. PCT/JP2014/004515 filed Sep. 3, 2014, which claims priority to Japanese Patent Application No. 2013-205694, filed Sep. 30, 2013. The entire disclosures of the above patent applications are hereby incorporated by reference.

The present invention relates to a jacket heater.

BACKGROUND ART

For example, the cited document 1 discloses a heating element unit in which heater wires are arranged between at least two sheets of base cloths that are laid on each other, at least two base cloths are joined by a plurality of jointing wires that are parallel to each other, and the heater wire is arranged so as to pass through between the joining wires.

The cited document 2 discloses a tape heater in which a heating element unit is supported on a heating surface on a belt-like base member having heat resistance and flexibility and the entire part thereof is covered by a covering layer composed of a heat-resistant resin sheet.

RELATED ART DOCUMENTS

Patent Documents

Patent Document 1: JP-A-2005-71930

SUMMARY OF THE PRESENT INVENTION

An object that is heated by a jacket heater is, for example, a pipe, a flange, a joint, a valve or the like that internally accommodates a liquid or a gas. As for the jacket heater according to the present invention, the jacket heater is placed in adjacent to the objects by winding around or placing along therewith in conformity with the contours of the object.

A jacket heater is preferably provided by deforming the shape of own, to fit in itself with the contours of an object to be heated, in order that a gap between itself and the object would be made as little as possible. For this purpose, the inventors think it necessary that the surface of the jacket heater which contacts with the object should be flexible.

Namely, it is thought that the outer covering member constituting the jacket heater is preferably formed of a material having high flexibility. Taking into consideration the case where an object is required to be heated at around 150° C., or the case where an object itself produces heat a temperature of around 150° C., it is thought that the jacket heater is required to have a certain heat resistance.

On the other hand, there is a case where an object has to be maintained at a predetermined temperature by providing a jacket heater. In such a case, measures that the outer surface of the jacket heater placed on the object is further covered with an aluminum sheet or a thermal insulator so as not to be affect by heat from outside is generally taken.

However, in the case of taking such measures, when, for example, for the purpose of maintenance of a pipe that is an object to be heated by a jacket heater, or other purposes, the placed jacket heater is needed to be removed from the object, an aluminum sheet, a thermal insulator, or the like which covers the jacket heater has to be removed. This makes a lot of troubles for users. Also, the more number of members are put around the object, the more gaps tend to be generated among the members. Then, ambient air comes in through the gaps and the object to be heated is exposed to ambient air, so that the efficiency of energy for maintaining the desired temperature may decrease.

The present invention relates to a jacket heater placed in adjacent to an object to be heated so as to heat and keep warm the object, and aims to provide a jacket heater which effectively keeps warm the object to be heated.

The above-mentioned object and other objects and new features will be explained by the disclosure of this description and the accompanying drawings.

Means for Solving the Problems

The jacket heater according to the present invention to dissolve the above-mentioned problem is a jacket heater placed in adjacent to an object to be heated so as to heat and keep warm said object, which comprises:

a heating element, an outer covering member that envelops and accommodates the heating element, wherein the outer covering member is configured to comprise a first shaped body that is provided on a side thereof facing the object, and a second shaped body that is provided on a side opposite from said side facing the object, the second shaped body is a resin shaped body that has a porous structure, and the second shaped body has larger thickness than the first shaped body has.

Also, the second shaped body may have a plurality of pores that are formed by stretching a resin shaped body. Also, the second shaped body may be made of PTFE (polytetrafluoroethylene).

Also, a metal thin film may be further included between the heating element and the first shaped body. Also, the thickness of the second shaped body may be 1 mm or more and 20 mm or less.

Also, the heat conductivity of the second shaped body may be 0.10 W/(m·K) or less. Also, the porosity of the second shaped body may be 60 to 90%. Also, the pore diameter of the second shaped body may be 200 μm or less.

Advantageous Effects of the Present Invention

According to the present invention, the present invention relates to a jacket heater placed in adjacent to an object to be heated so as to heat the object, and provides for a jacket heater which efficiently keeps warm an object that has been heated.

MODE FOR CARRYING OUT THE PRESENT INVENTION

Figure 1:
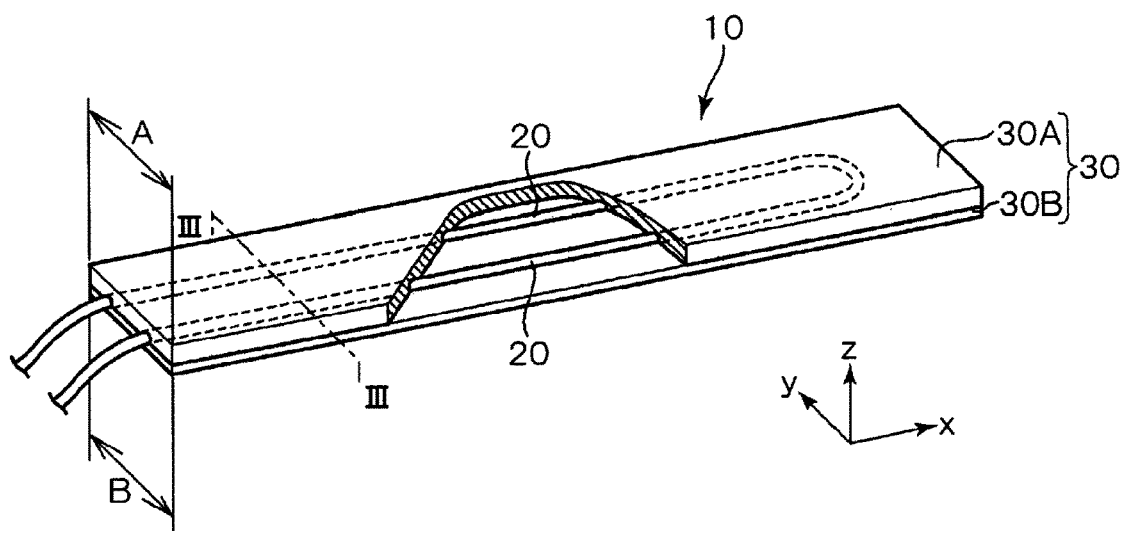
FIG. 1 is a partially cutaway perspective view of a jacket heater according to the first embodiment of the present invention.

A jacket heater according to the present invention is a jacket heater placed in adjacent to an object to be heated so as to heat and keep warm said object, which comprises:

a heating element, an outer covering member that envelops and accommodates the heating element, wherein the outer covering member is configured to comprise a first shaped body that is provided on a side thereof facing the object, and a second shaped body that is provided on a side opposite from said side facing the object, the second shaped body is a resin shaped body that has a porous structure, and the second shaped body has larger thickness than the first shaped body has.

Here, an object to be heated by the jacket heater includes, for example, a pipe, a flange, a connection, a valve or the like, which internally accommodates prescribed liquid or gas. According to one embodiment of the jacket heater of the present invention, the jacket heater may be placed in adjacent to the object by winding around or placing along in conformity with the contours of these objects.

Alternatively, such a jacket heater is predefined in its shape that corresponds to the contours of an object to be heated. However, the inventors considered that if the jacket heater is enough flexible to freely deform its shape to conform to the contours of an object, it can be broadly applied to various objects.

Accordingly, the inventors considered it preferable that the outer covering member constituting the jacket heater of the present invention is preferably formed of a highly flexible material.

Thus, as one embodiment of the jacket heater of the present invention, it may be one that deforms its shape to conform to the contours of an object and heats and keeps warm the object.

Also, there is the case where an object requires heating at around 150° C., and the outer covering member constituting the jacket heater may need a prescribed heat resistance in order to fulfill such a requirement.

Also, as mentioned above, there is a case where an object heated by providing a conventional jacket heater may be required to keep its predetermined temperature constant. In such a case, measures that the outer surface of the jacket heater placed on the object is further covered with an aluminum sheet or a thermal insulator so as not to be affect by heat from outside is generally taken.

However, in the case of taking such measures, when, for example, for the purpose of maintenance of a pipe that is an object to be heated by a jacket heater, or other purposes, the placed jacket heater is needed to be removed from the object, an aluminum sheet, a thermal insulator, or the like which covers the jacket heater has to be removed. This makes a lot of troubles for users.

Also, the more number of members are put around the object, the more gaps tend to be generated among the members. Then, ambient air comes in through the gaps and the object to be heated is exposed to ambient air, so that the efficiency of energy for maintaining the desired temperature may decrease.

Hence, the inventors conducted extensive research to realize a jacket heater for heating an object, which can be easily placed in adjacent to the object as well as can efficiently keep the heated object warm. As a result, the inventors conceived the jacket heater of the present invention.

First, the first embodiment of the jacket heater of the present invention will be explained below in detail with reference to the drawings. FIG. 1 is a perspective view with a partial cutout of the jacket heater according to the first embodiment. The jacket heater 10 according to the first embodiment is one that deforms its shape to conform to the contours of an object and is placed in adjacent to the object so as to heat and keep warm the object. The object to be heated and kept warm is provided in the opposite direction of a Z direction (−Z direction) shown in FIG. 1.

Here, in the case where an object is a pipe (straight pipe), for example, the jacket heater of the first embodiment may be wound around the outer periphery of the pipe such that the jacket heater deforms its shape to conform to the contours of the pipe.

Alternatively, the jacket heater of the first embodiment may be provided along the longitudinal direction of a pipe, such that it simply deforms its shape to conform to the contours of the pipe. In this case, the jacket heater of the first embodiment deforms it shape into divided portions in the longitudinal direction of the cylindrical configuration of the pipe, so that it is provided along the periphery of the pipe so as to envelop the pipe.

Figure 4A:
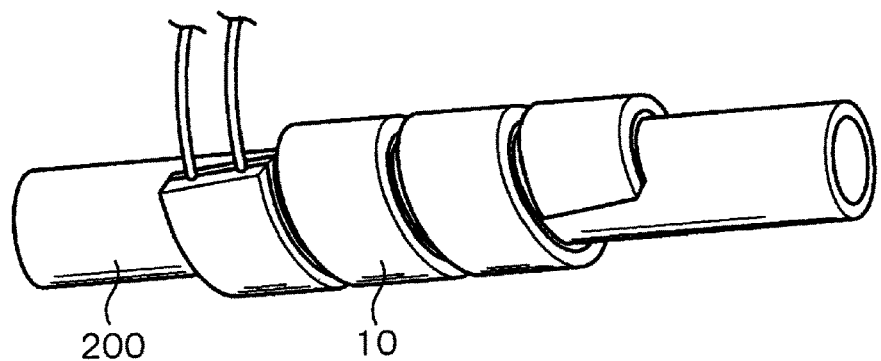
FIG. 4A is a view showing one example of a state in which the jacket heater shown in FIG. 1 deforms its shape to conform to the contours of the object and keeps warm or heats the object.

FIG. 4A is a view showing an example in the state that the jacket heater shown in FIG. 1 deforms its shape to conform to the contours of the object and keeps warm or heats the object. In FIG. 4A, the object to be kept warm or the like is a pipe (straight pipe), and the jacket heater 10 deforms its shape to conform to the contours of the object 200 and is placed in adjacent to the object 200. FIG. 4A shows an embodiment in that the jacket heater shown in FIG. 1 is wound around the periphery of a pipe that is the object.

Figure 4B:
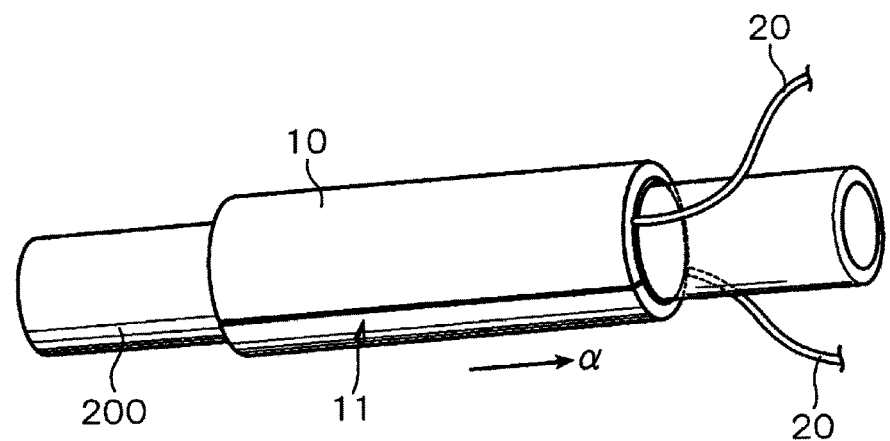
FIG. 4B is a view showing another example of a state in which the jacket heater shown in FIG. 1 deforms its shape to conform to the contours of the object and keeps warm or heats the object.

Also, FIG. 4B is a view showing another example in the state that the jacket heater shown in FIG. 1 deforms its shape to conform to the contours of an object to heat or keep warm the object. In FIG. 4B, an object to be kept warm or the like is also a pipe (straight pipe), and FIG. 4B shows an embodiment in that the jacket heater shown in FIG. 1 is provided along the longitudinal direction of the pipe while deforming its shape to conform to the contours of the object.

As mentioned above, the jacket heater 10 of the first embodiment may be provided by winding itself around the periphery of a pipe that is an object, such that the longitudinal direction of the jacket heater 10 conforms the circumferential direction of the pipe. In this case, the jacket heater 10 may be wound around the pipe such that the edges thereof overlap with each other. Thus, provision of the jacket heater 10 around the object 200 more improves the effect to keep warm the object 200. Here, the embodiments of the provision of the jacket heater 10 are not limited to those shown in FIGS. 4A and 4B.

As shown in FIG. 1, a jacket heater 10 includes a heating element 20 and an outer covering member 30 that envelops and accommodates the heating element 20. The outer covering member 30 is configured to include a first shaped body 30B that is provided on a side thereof facing the object, and a second shaped body 30A that is provided on a side opposite from said side facing the object. The second shaped body 30A is a resin shaped body that has a porous structure, and the second shaped body 30A has a larger thickness than the first shaped body 30B has.

The heating element 20 that constitutes the jacket heater 10 according to the first embodiment is realized by an electric heater wire, for example. While the above-mentioned electric heater wire is not particularly limited, it may be a nichrome wire or a SUS wire. The power consumption of the electric heater wire is appropriately set in accordance with the application of the jacket heater 10 of the present invention. Normally, the power consumption may be 10 to 500 W.

In respect of safety and durability, the outer peripheral part of the electric heater wire may be covered by a protective material such as a heat-resistant and electrically insulating material. Although the protective material is not particularly limited, silica sleeve or cloth, alumina sleeve or cloth, glass sleeve or cloth or the like can be given. Among these, silica sleeve can be used safely. Here, the heating element 20 includes a planar heater formed in the shape of a plane or the like. Any heating element may be used as long as it generates heat utilizing resistance heating.

In the jacket heater 10 shown in FIG. 1, a single electric heater wire as the heating element 20 is accommodated within the outer covering member 30. The electric heater wire enters the inside of the outer covering member 30 from one end of the outer covering member 30, makes a U-turn at the other end of the outer covering member 30, and is taken out of the outer covering member 30 again from the one end of the outer covering member 30. In the jacket heater 10 shown in FIG. 1, the electric heater wire makes only a single U-turn in the inside of the outer covering member 30. The electric heater wire may have a structure in which the electric heater wire makes repeated U-turns at the both ends of the outer covering member 30.

The electric heater wire that the parts thereof are arranged side by side by making a U-turn as explained above is provided such that they do not contact with each other inside of the outer covering member 30.

Then, the outer covering member 30 used for the jacket heater 10 according to the first embodiment will be explained. The most significant feature of the jacket heater 10 according to the first embodiment is to be configured such that the outer covering member 30 includes a first shaped body 30B that is provided on a side thereof facing the object, and a second shaped body 30A that is provided on a side opposite from said side facing the object, and the second shaped body 30A is a resin shaped body that has a porous structure, and the second shaped body 30A has a larger thickness than the first shaped body 30B has.

The smaller the thickness of the first shaped body 30B that is provided on the side of the outer covering member facing an object, the more flexible it is, so that it becomes easy to install on the object. On the other hand, the larger the thickness of the second shaped body 30A that is provided on the opposite side of the outer covering member 30 facing an object, the more effectively the object is kept warm.

The jacket heater 10 according to the first embodiment can consist easiness of installation thereof on an object with the effect to keep warm the object, by the use of the second shaped body 30A that has a larger thickness than the first shaped body 30B has.

Namely, the jacket heater 10 according to the first embodiment has excellent performances of not only heating but also keeping warm an object by the provision of a thick outer-coat on the opposite side thereof facing the object. At the same time, the jacket heater 10 can also achieve the easiness of installation on an object by the provision of a thin outer-coat on the side thereof facing an object.

It is expected that the jacket heater 10 according to the first embodiment heats or keeps warm an object at a temperature of about 100 to 200° C. Hence, the heating element 20 provided in the jacket heater 10 can generate heat at a temperature of 200° C. or higher and up to around 300° C. Therefore, the second shaped body 30A constituting the outer covering member 30 of the jacket heater 10 according to the present invention may have a melting point of 300° C. or higher.

Also, the second shaped body 30A constituting the outer covering member 30 of the jacket heater 10 according to the first embodiment may have a melting point of 310° C. or higher. Here, there is no particular limitation of the upper limit of the melting point of the second shaped body 30A constituting the outer covering member 30 of the jacket heater 10 according to the first embodiment, but it may be 400° C. or lower, for example.

Likewise, the first shaped body 30B constituting the outer covering member 30 of the jacket heater 10 according to the first embodiment may have a melting point of 300° C. or higher. Also, the first shaped body 30B constituting the outer covering member 30 of the jacket heater 10 according to the first embodiment may have a melting point of 310° C. or higher.

Here, there is no particular limitation of the upper limit of the melting point of the first shaped body 30B constituting the outer covering member 30 of the jacket heater 10 according to the first embodiment, but it may be 400° C. or lower, for example.

Figure 2:
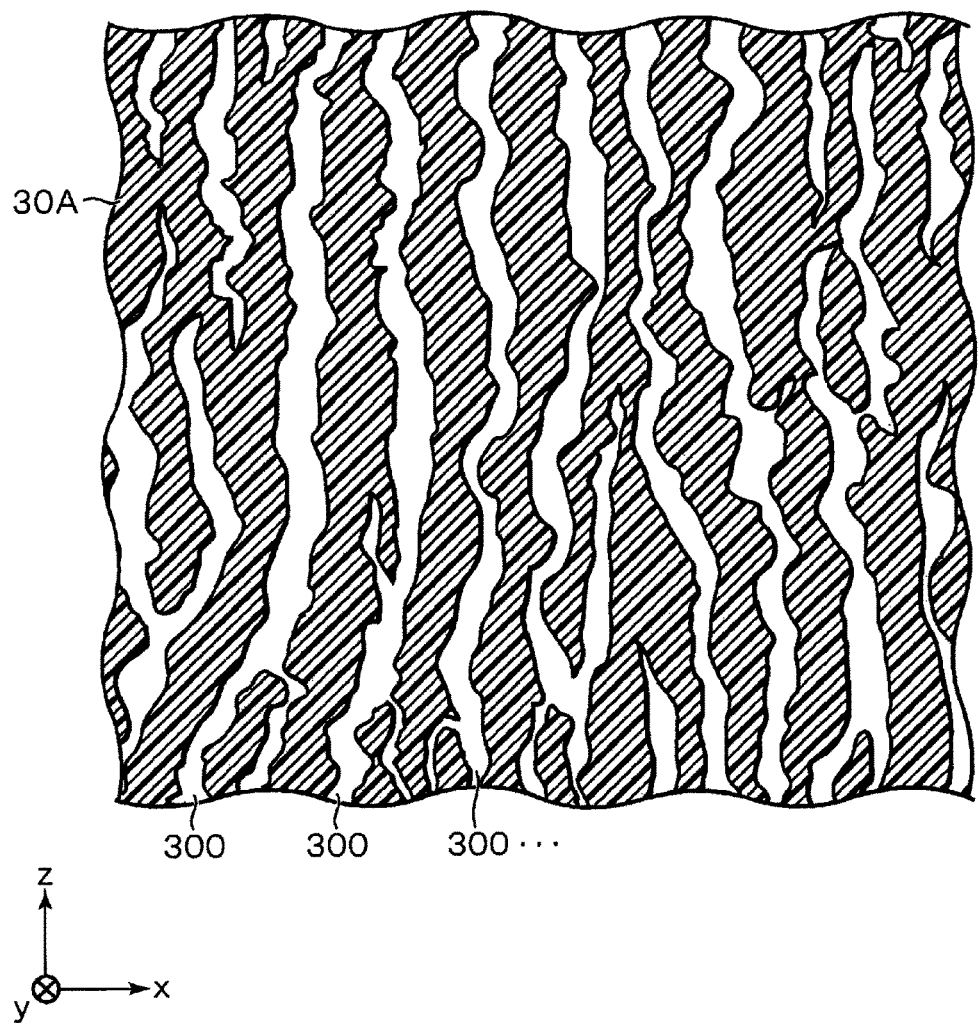
FIG. 2 is an enlarged view showing a part of section of the second shaped body that constitutes the outer covering member according to the first embodiment of the jacket heater of the present invention.

Next, the porous structure that the second shaped body 30A has will be explained below with reference to the drawings. FIG. 2 is an enlarged view showing a part of section of the second shaped body 30A that constitutes the outer covering member 30 according to the first embodiment of the jacket heater 10.

As shown by FIG. 2, the second shaped body 30A, that is mad of a resin and has a melting point of 300° C. or higher, and that constitutes the outer covering member 30 of the jacket heater 10 according to the first embodiment, has a plurality of pores 300 formed in the planar direction of the sheet (Z direction in the figure). And, when the jacket heater 10 is placed on an object and the jacket heater 10 has been used and heated, the second shaped body 30A can accumulate heat in the plurality of pores 300 and improve the effect of keeping warm an object.

Also, the second shaped body 30A constituting the outer covering member 30 of the jacket heater 10 according to the first embodiment may have the heat conductivity of 0.1 W/(m·K) or less. Here, the heat conductivity is determined in accordance with JIS A 1412-2. Also, the heat conductivity of the second shaped body 30A is preferably 0.08 W/(m·K) or less, and particularly preferably 0.06 W/(m·K) or less. By the heat conductivity of the second shaped body 30A being 0.10 W/(m·K) or less, the effect of keeping warm an object increases, so that the advantageous effect of the present invention can be further improved.

Also, the lower limit of the heat conductivity of the second shaped body 30A constituting the outer covering member 30 of the jacket heater 10 according to the first embodiment is not particularly limited, but it may be 0.01 W/(m·K) or more, or 0.02 W/(m·K) or more, for example.

Also, the porosity of the second shaped body 30A constituting the outer covering member 30 of the jacket heater 10 according to the first embodiment may be 60 to 90%. The effect of keeping warm an object is increased by the porosity being 60 to 90%, as a result, the advantageous effect of the present invention further increases.

Also, by the second shaped body 30A having the porosity of 60 to 90%, the jacket heater can have good flexibility. By this, the jacket heater easily deforms its shape to conform the contours of an object. As a result, operation of placing the jacket heater becomes easy.

Here, the porosity is determined as follows: a part of the second shaped body 30A is cut out as a test piece, the volume and weight of the test piece are measured, and the porosity is calculated based on the volume and weight of the test piece. The volume of a test piece is measured with a caliper, a steel measuring tape or a micrometer. Also, the weight is measured with a scale.

The calculation of porosity will be explained more specifically: a theoretical weight in the case of the porosity being 0% is calculated from the known density of a material (raw material) which forms the second shaped body 30A (for example, when a material from which the second shaped body 30A is PTFE, the density is 2.17 (g/cm$^3$)). The porosity of a test piece is calculated based on the ratio between the theoretical weight and the values of the volume and the weight that are measured by the above-mentioned method.

Also, the pore diameter of the second shaped body 30A constituting the outer covering member 30 of the jacket heater 10 according to the first embodiment may be, for example, 200 µm or less, in order to provide for gas permeability and liquid impermeability. By the pore diameter being 200 µm or less, the effect of keeping warm an object is increased. As a result, the advantageous effect of the present invention can be further improved.

The lower limit of the pore diameter of the second shaped body 30A constituting the outer covering member 30 of the jacket heater 10 according to the first embodiment is not particularly limited, but it may be, for example, 1 µm or more, or 5 µm or more.

The thickness of the second shaped body 30A constituting the outer covering member 30 of the jacket heater 10 according to the first embodiment may be 1 mm or more, and 20 mm or less. By the second shaped body 30A having a thickness of 1 mm or more, the effect of keeping warm an object is increased. As a result, the advantageous effect of the present invention is further increased.

Also, by the second shaped body 30A constituting the outer covering member 30 of the jacket heater 10 according to the first embodiment having the upper limit of a thickness of 20 mm or less, an operation of placing it to an object becomes easy. By this, the jacket heater easily deforms its shape to conform to the contours of an object and is placed in adjacent to an object without gaps easily. Thereby, the effect of keeping warm an object is increased, and as a result, the advantageous effect of the present invention is further increased.

The thickness of the second shaped body 30A is further preferably 15 mm or less, for example, and particularly preferably 10 mm or more and 5 mm or less. Then, the lower limit of the thickness of the second shaped body 30A is preferably 1.5 mm or more, and further preferably 2 mm or more, in view of increase of the effect of keeping warm an object.

The second shaped body 30A that constitutes the outer covering member 30 of the jacket heater 10 according to the first embodiment may be made of a fluororesin, for example. By forming the second shaped body 30A by using a fluororesin, an excellent heat resistance is imparted, and in addition, properties such as resistance to chemicals and resistance to solvents are imparted. It is preferred that the second shaped body 30A be formed of a fluorine-containing polymer such as PTFE (polytetrafluoroethylene), PFT (tetrafluoroethylene-perfluoroalkoxyethylene copolymer) and FEP (tetrafluoroethylene-hexafluoropropylene copolymer). PCTFE (polychlorotrifluoroethylene), ETFE (tetrafluoroethylene-ethylene copolymer), ECTFE (chlorotrifluoroethylene-ethylene copolymer), PVDF (polyvinylidene fluoride) or the like can be used. The porous sheet 30A may be made of PTFE. The second shaped body 30A may be made of PTFE.

The jacket heater 10 according to the first embodiment is excellent in warmth keeping property, so that the difference in temperature between the object side to be kept warm or the like and the ambient air side is large. As a result, condensation often occurs on the surface of the jacket heater 10. However, it can be expected that condensation be controlled by forming the second shaped body 30A from PTFE which has water resistance (water repellencies). Further, even when PTFE is heated, generation of gas, particle, or the like due to the PTFE is little, so that it has a merit that it can be used for the place required to be kept clean.

Also, the second shaped body 30A may have a plurality of pores 300 made by stretching a resin shaped body. When a resin shaped body is stretched, a part of entanglement among polymers constituting the resin shaped body comes loose and a plurality of pores 300 are formed.

A plurality of pores 300 made by stretching a resin shaped body are very fine pores, which can increase the effect of keeping warm an object.

The material of the second shaped body 30A may be one in which a plurality of pores 300 are formed by stretching a resin sheet in multiple directions. In this case, a plurality of pores 300 may be formed in the second shaped body 30A by biaxial stretching a resin sheet. The second shaped body 30A may be made of a material in which a plurality of pores 300 are formed by longitudinally stretching a resin tube.

A plurality of pores 300 may be formed in the second shaped body 30A by stretching a resin sheet with heating. When a resin shaped body is stretched with heating, a part of entanglement among polymers constituting the resin shaped body comes loose more easily. As a result, a plurality of pores 300 are easily formed inside the shaped body.

Here, it is assumed that the second shaped body 30A in which a plurality of pores 300 are formed by stretching a resin sheet is in a state where stress is applied to the inside thereof by the stretching. In such a state in which stress is exerted to the inside thereof, if heat is applied from the outside, the second shaped body 30A acts to fill the pores formed by stretching by the so-called stress relaxation, and as a result, the pore diameter of the second shaped body 30A is reduced.

In this manner, when the jacket heater 10 is used for practical purpose, the pores 300 of the second shaped body 30A reduce in their diameter, and as a result, the second shaped body 30A retains a state that has been fitted to the contours of an object to be heated. By this, the jacket heater 10 is excellent in the flexibility when it is placed on an object, therefore, can be easily constructed. On the other hand, the shape of the jacket heater 10 retains a state that has been fitted to the contours of the object after it is placed on an object, and as a result, such an effect that the jacket heater 10 becomes hard to fall from the object is obtained.

Alternatively, the second shaped body 30A may have a plurality of pores 300 by stretching a resin shaped body with heat at 300 to 400° C. When the temperature at the time of stretching is set at 300 to 400° C. which overlaps the temperature in practical use of the jacket heater 10, the second shaped body 30A is exposed to heat radiated from the heating element 20, so that the second shaped body 30A becomes easy to fit to the contours of an object to be heated, and the effect that the jacket heater 10 becomes hard to fall from the object is further increased.

When the second shaped body 30A is made of polytetrafluoroethylene, the polytetrafluoroethylene may be uncalcined polytetrafluoroethylene. In other words, uncalcined polytetrafluoroethylene may be polytetrafluoroethylene having a plurality of peaks derived from thermal energy absorption of the polytetrafluoroethylene detected when the polytetrafluoroethylene is molten in a differential scanning calorimetry (DSC) measurement.

Hereinbelow, a more specific explanation will be given along with a differential scanning calorimetry (DSC) measurement method, whether polytetrafluoroethylene has a plurality of peaks derived from thermal energy absorption.

The differential scanning calorimetry (DSC) measurement is conducted by means of a differential scanning calorimeter (DSC-60A: manufactured by Shimadzu Corporation). A sample to be measured is molten by heating it at a temperature elevation speed of 10° C./min to 400° C. The melting point and the number of melt peaks that occur when the sample is molten are measured.

Polytetrafluoroethylene is a crystalline polymer. For example, fine powder of polytetrafluoroethylene (raw material) produced by emulsion polymerization has a highly-crystallized state with a high crystallization degree (e.g. high crystallization degree: 80% or more). The melting point thereof exceeds 337° C.

When this fine powder of polytetrafluoroethylene (raw material) is molten (calcined) completely, the crystallization degree is lowered (for example, crystallization degree of about 30 to 70%), and the melting point (a peak derived from absorption of thermal energy in the DSC measurement) is shifted to a range of 327±10° C., and is detected as a single peak in the temperature range.

On the other hand, in the differential scanning calorimetry (DSC) measurement results of uncalcined polytetrafluoroethylene, the melting point (a peak derived from thermal absorption in the DSC measurement) is detected at two locations; i.e. a range of 327° C.±10° C. and a range exceeding 337° C.

That is, the second shaped body 30A formed of uncalcined polytetrafluoroethylene has un-molten parts in its structure, and these parts differ in crystallization degree. As a result, in the differential scanning calorimetry (DSC) measurement results, a plurality of peaks derived from absorption of thermal energy are measured.

The crystallization degree before melting (calcination) is larger than the crystallization degree after melting. This means that, in the second shaped body 30A formed of uncalcined polytetrefluoroethylene, polymers having different crystallization degrees are present in a mixed state in the second shaped body 30A.

When the second shaped body 30A formed of uncalcined polytetrafluoroethylene in which the crystallization degree differs from part to part is exposed to heat, in order to homogenize the crystallization degree in the structure, a structural change is more accelerated within the second shaped body 30A, whereby the degree of shrinkage of pores is enhanced. As a result, it is preferred that, when the second shaped body 30A formed of uncalcined polytetrafluoroethylene is exposed to heat, the second shaped body 30A be retained in a state that has been fitted to the contours of the object to be heated.

Next, the first shaped body 30B constituting the outer covering member 30 of the jacket heater 10 according to the first embodiment will be explained.

The first shaped body 30B is preferably formed of a material excellent in heat resistance, flexibility and the like, since it is disposed in the side in contact with, for example, a pipe as the object to be kept warm. As examples of such material, fibrous fabrics and non-woven fabrics made of a heat resistant organic material, for example, a fluororesin such as PTFE, PFT, FEP, PCTFE, ETFE, ECTFE and PVdF; aramid resin, polyamide, polyimide, polycarbonate, polyacetal, polybutylene terephthalate, modified polyphenylene ether, polyphenylene sulfide, polysulfone, polyether sulfone, polyarylate and polyether ether ketone; or an inorganic material such as glass, ceramics and silica can be given. The material is appropriately selected and used in accordance with a temperature at which the object is kept warm or heated. The materials may be used in a mixture. If they have flexibility, a shaped body as a continuous body of each material can also be used.

The first shaped body 30B may be made of a resin. The first shaped body 30B made of a resin is excellent in flexibility so that placement of the sheet on an object is facilitated. By this, the jacket heater deforms its shape to conform to the contours of an object and is easily placed in adjacent to the object without a gap. As a result, the effect of keeping warm the object is improved, and the advantageous effects of the present invention are further enhanced.

The jacket heater 10 according to the first embodiment conducts heat radiated from the heating element 20 to an object to be kept warm or the like via the first shaped body 30B. Therefore, the first shaped body 30B may have heat conductivity higher than the second shaped body 30A has.

In order to effectively conduct the heat radiated from the heating element 20 to an object to be kept warm or the like via the first shaped body 30B, the first shaped body 30B preferably has a small thickness. For example, the thickness of the first shaped body 30B may be 3 mm or less, or 1.5 mm or less. The lower limit of the thickness varies dependent upon physical strength of a material constituting the first shaped body 30B but it may be 0.1 mm or more.

In order to effectively conduct the heat radiated from the heating element 20 to an object to be kept warm or the like via the first shaped body 30B, the first shaped body 30B preferably has a solid structure. By the first shaped body 30B having a solid structure, conduct of the heat radiated from the heating element 20 can be made effective.

The first shaped body 30B may be a resin sheet having a solid structure. By this, flexibility derived from the material used, and heat conductivity derived from the thickness and the structure are satisfied, and the advantageous effects of the present invention are further enhanced.

In the outer covering member 30, the first shaped body 30B and the second shaped body 30A may be joined by sewing, thermal welding or the like. Further, the first shaped body 30B and the second shaped body 30A may be joined by adhesion to each other via an adhesive or the like.

In a system to heat or keep warm an object wherein the jacket heater as described above is placed to the object, the jacket heater can be placed in adjacent to the object. At the same time, to keep warm the object can be realized without provision of a heat insulating material other than the jacket heater.

That is to say, a system for heating and keeping warm an object is provided. The system comprises:

a jacket heater comprising a heating element and an outer covering member that envelopes and accommodates the heating element, and an object to be heated and kept warm by the jacket heater, wherein the jacket heater is placed next to the object, and the outer covering member is configured to comprise a first shaped body that is provided on a side thereof facing the object, and a second shaped body that is provided on a side opposite from said side facing the object, the second shaped body is a resin shaped body that has a porous structure, and the second shaped body has a larger thickness than the first shaped body has. Hereinbelow, various variations of the jacket heater 10 according to the first embodiment will be explained. However, it should be understood that the jacket heater 10 according to the first embodiment is not limited to the following variations.

First Variation of First Embodiment

Figure 3A:
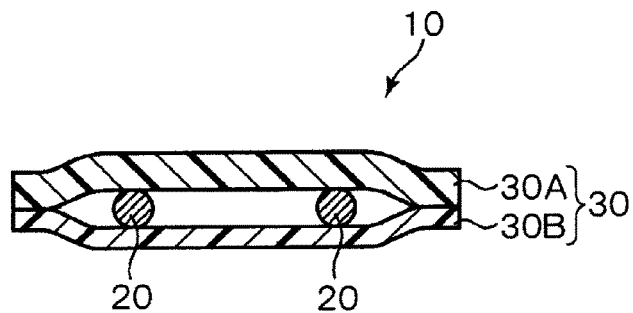
FIG. 3A is a view showing one example of the cross section taken along line III-III in FIG. 1.

FIG. 3A is a view showing one example of the cross section taken along line III-III in FIG. 1. As shown in FIG. 3A, the electric heater wire 20 that the parts thereof are arranged side by side by making a U-turn is provided such that they are apart from each other so that they do not contact with each other. For example, the electric heater wire shown in FIG. 3A may be directly fixed to the first shaped body 30B made of a resin constituting the outer covering member 30.

Here, in the first variation of the first embodiment, the first shaped body 30B and the second shaped body 30A are joined by sewing. However, the thread used for sewing is omitted so that it is not shown in the figure.

Second Variation of First Embodiment

Figure 3B:
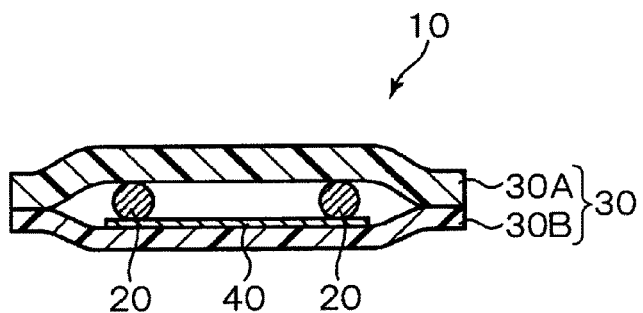
FIG. 3B is a view showing another example of the cross section taken along line III-III in FIG. 1.

FIG. 3B is a view showing another example of the cross section taken along line III-III in FIG. 1. As shown in FIG. 3B, the electric heater wire 20 that the parts thereof are arranged side by side by making a U-turn is provided such that they are apart from each other so that they do not contact with each other. Therefore, the jacket heater 10 according to the second variation of the first embodiment is configured to further include a substrate 40 that supports the electric heater wire 20.

The substrate 40 is a substrate 40 that supports an electric heater wire 20. Therefore, it may be preferably formed of a material being excellent in heat insulating properties in addition to heat resistance and flexibility. As examples of such material, fibrous fabrics and non-woven fabrics made of a heat resistant organic material, for example, a fluororesin such as PTFE, PFT, FEP, PCTFE, ETFE, ECTFE and PVdF; aramid resin, polyamide, polyimide, polycarbonate, polyacetal, polybutylene terephthalate, modified polyphenylene ether, polyphenylene sulfide, polysulfone, polyether sulfone, polyarylate and polyether ether ketone; or an inorganic material such as glass, ceramics and silica can be given. The material is appropriately selected and used in accordance with a temperature at which the object is kept warm or heated. The materials may be used in a mixture. If they have flexibility, a sheet as a continuous body of each material can also be used.

The dimension of the substrate 40 is not particularly limited. Normally, the thickness is about 0.5 to 3.0 mm, the width is about 10 to 50 mm, and the length is about 500 to 1000 mm. According to need, the substrate 40 may be thicker or thinner, wider or narrower, or longer or shorter. If necessary, two or more substrates 40 may be used by staking one on another.

The method for allowing the electric heater wire 40 to be supported by the substrate 40 is not particularly restricted. A method in which the electric heater wire and a substrate part that supports the electric heater wire 20 are sewn by roll sewing by using thin heat-resistant fibers such as glass yarn, silica yarn, alumina yarn and those obtained by coating them with a fluororesin, or threads, or a metal wire; a method in which an electric heater wired part is bonded to the substrate by pushing with a mesh-like sheet; a method in which the electric heater wire itself is sewn by means of a sewing machine or other methods can be given. At this time, it is preferred that the electric heater wire 20 be covered by a heat resistant material as little as possible in respect of heat efficiency.

Third Variation of First Embodiment

Figure 3C:
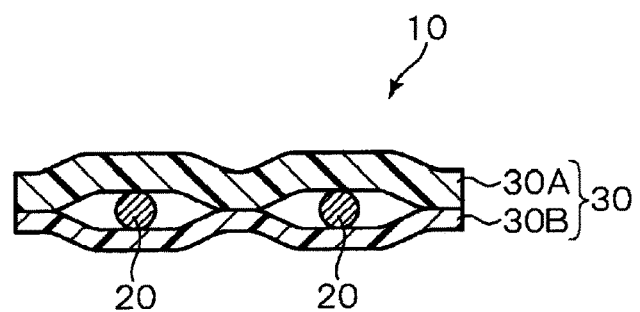
FIG. 3C is a view showing another example of the cross section taken along line III-III in FIG. 1.

FIG. 3C is a view showing another example of the cross section taken along line III-III in FIG. 1. As shown in FIG. 3C, the electric heater wire that the parts thereof are arranged side by side by making a U-turn has a configuration in which the first shaped body 30B and the second shaped body 30A are joined between the parts of the electric heater wire such that they do not contact with each other.

Joining of the outer covering members 30 between the electric heater wire in this variation may be conducted by sewing, thermal welding, adhesion or the like. The outer covering members 30 between the electric heater wire in this embodiment may be stapled by means of a stapler. In this variation, the outer covering members 30 between the electric heater wire are joined by sewing.

Fourth Variation of First Embodiment

Figure 3D:
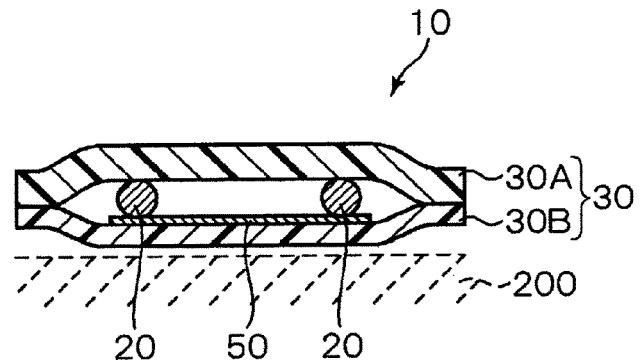
FIG. 3D is a view showing another example of the cross section taken along line III-III in FIG. 1.

FIG. 3D is a view showing another example of the cross section taken along line III-III in FIG. 1. As shown in FIG. 3D, the electric heater wire that the parts thereof are arranged side by side by making a U-turn is provided such that they are apart from each other so that they do not contact with each other. In addition, a metal thin film 50 is provided between the electric heater wire 20 and the first shaped body 30B.

The metal thin film 50 provided in the fourth variation has excellent heat conductivity. Due to the provision of the metal thin film 50 having excellent heat conductivity, heat generated by the heater is distributed more uniformly on the heating side of the jacket heater 10 (the side on which the first shaped body 30B is provided), whereby the object 200 to be heated or the like can be heated or the like uniformly.

The metal thin film 50 may be formed of aluminum, for example. In order to prevent tearing, the metal thin film 50 may be reinforced by allowing it to have a stacked structure in which a heat-resistant film or the like is stacked, if necessary. In this case, it is preferred that the heat-resistant film be as thin as possible.

The thickness of the metal thin film 50 may be 20 µm to 5 mm, for example. By allowing the thickness of the metal thin film 50 to be 20 µm to 5 mm, effects that the heat generated by the heater is distributed more uniformly on the heating side surface of the jacket heater 10 can be exhibited more significantly. The thickness of the metal thin film 50 that constitutes the jacket heater 10 may be 30 µm to 100 µm, or 40 µm to 70 µm, for example.

Fifth Variation of First Embodiment

Figure 3E:
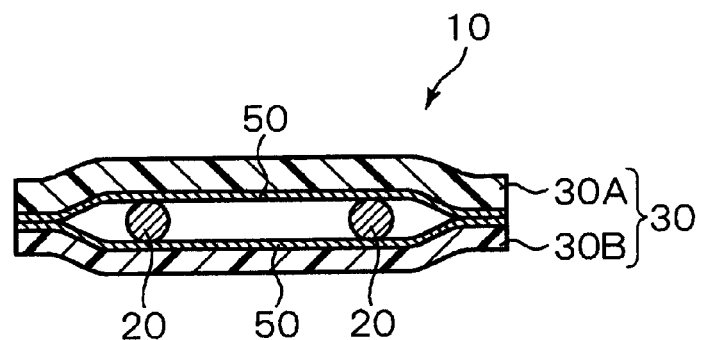
FIG. 3E is a view showing another example of the cross section taken along line III-III in FIG. 1.

FIG. 3E is a view showing another example of the cross section taken along line III-III in FIG. 1. In the jacket heater 10 shown in FIG. 3E, the metal thin film 50 provided in the jacket heater 10 in the fourth variation of the first embodiment is further provided on the side opposite to the side where the object to be heated or the like by the electric heater wire is provided. That is, in the fifth variation, the metal thin film 50 is provided between the electric heater wire 20 as the heating element and the second shaped body 30A, and between the electric heater wire 20 as the heating element and the first shaped body 30B.

In the jacket heater 10 according to the fifth variation of the first embodiment, as shown in FIG. 3E, on the entire surface of the outer covering member 30 of the side that envelops and accommodates the heating element 20, the metal thin film 50 provided between the outer covering member 30 and the heating element 20 may further be included.

Due to the provision of the metal thin film 50, that is excellent in gas barrier property or the like, on the entire inner surface of the outer covering member 30 as mentioned above, by using the jacket heater 10 (heat generation of the heating element 20), an advantageous effect is brought about that, if a pollutant such as dust and outgas is generated in the inside of the jacket heater 10, release of the outgas to the outside of the jacket heater 10 can be suppressed.

Sixth Variation of First Embodiment

Figure 3F:
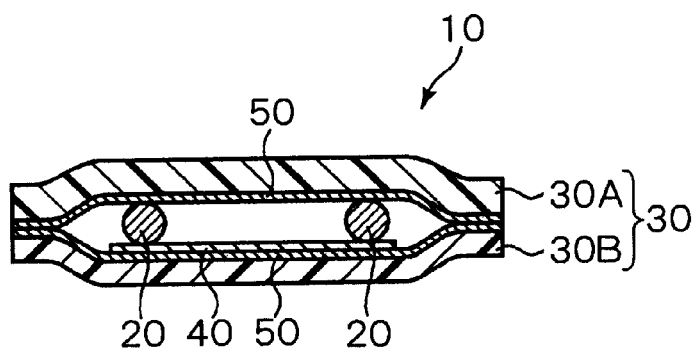
FIG. 3F is a view showing another example of the cross section taken along line III-III in FIG. 1.

FIG. 3F is a view showing another example of the cross section taken along line III-III in FIG. 1. The jacket heater 10 shown in FIG. 3F is one in which the jacket heater 10 of the fifth variation of the first embodiment further includes the substrate 40 provided in the jacket heater 10 in the third variation of the first embodiment.

Due to the provision of the substrate 40, a risk such that the parts of the heating element 20 contact with each other to short-circuit in the inside of the jacket heater 10 is reduced. Further, due to the provision of the metal thin film 50, an advantageous effect is brought about that, if a pollutant such as dust and outgas is generated in the inside of the jacket heater 10, release of the outgas to the outside of the jacket heater 10 can be suppressed.

Seventh Variation of First Embodiment

Figure 3G:
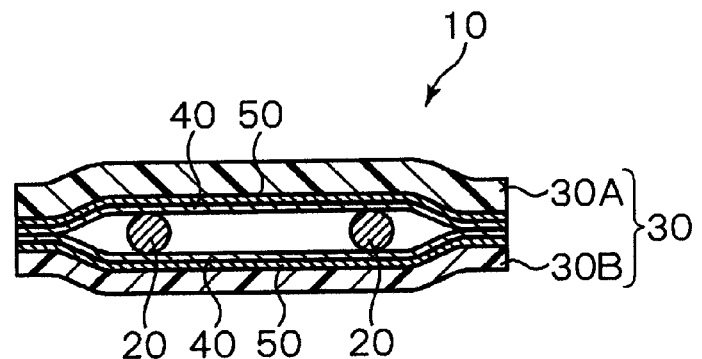
FIG. 3G is a view showing another example of the cross section taken along line III-III in FIG. 1.

FIG. 3G is a view showing another example of the cross section taken along line III-III in FIG. 1. The jacket heater 10 shown in FIG. 3G is one in which the substrate 40 of the jacket heater 10 of the sixth variation of the first embodiment is provided on the entire inner surface of the metal thin film 50.

Due to the provision of the substrate 40 on the side of the first shaped body 30B and the side of the second shaped body 30A in the inside of outer covering member 30, the heating element 20 is more firmly fixed, and the risk such that the parts of the heating element 20 contact with each other to short-circuit in the inside of the jacket heater 10 is more certainly reduced. Further, due to the provision of the thin film 50, an advantageous effect is brought about that, if a pollutant such as dust and outgas is generated in the inside of the jacket heater 10, release of the outgas to the outside of the jacket heater 10 can be suppressed.

Figure 5:
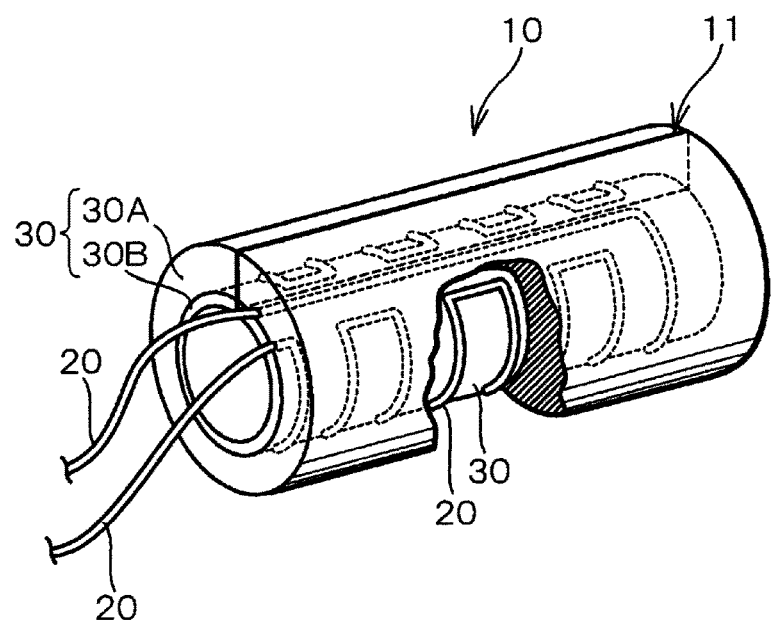
FIG. 5 is a partially cutaway perspective view according to the second embodiment of the jacket heater of the present invention.

Next, the second embodiment of the jacket heater according to the present invention will be explained in detail. FIG. 5 is a partially cutaway perspective view according to the second embodiment of the jacket heater according to the present invention.

As parts of the jacket heater 10 according to the second embodiment, the same parts used in the first embodiment as mentioned above can be used. When the jacket heater 10 according to the second embodiment is placed to an object such as a pipe, a joint 11 shown in FIG. 5 is opened by the use of the flexibility of the outer covering member 10 constituting the jacket heater 10 according to the second embodiment, and the jacket heater 10 can be easily placed to the object such that the object is held inside the jacket heater 10.

In the jacket heater 10 shown in FIG. 5, a single one electric heater wire as the heating element 20 is accommodated within the outer covering member 30 (between the first shaped body 30B and the second shaped body 30A).

The electric heater wire enters the inside of the outer covering member 30 from one end of the outer covering member 30, once extends longitudinal direction of the jacket heater 10, and makes repeated U-turns such that the electric heater wire surrounds in the peripheral direction of the jacket heater 10, and is taken out of the outer covering member 30 again from the one end of the outer covering member 30.

The heating element 20 according to the second embodiment is not limited to the arrangement manner shown in FIG. 5, if it is arranged in the way that it encloses an object to be heated and kept warm. In the outer covering member 30, the electric heater wire that the parts thereof are arranged side by side by making a U-turn as explained above is provided such that they do not contact with each other, which is the same manner as in the jacket heater according to the first embodiment.

In the case where the jacket heater is placed to a pipe as the object in the state shown in FIG. 4B as mentioned above, it is preferable for the efficiency of keeping warm the pipe that the edges of the jacket heater fit closely to each other along the length direction (a direction indicated in FIG. 4B) of the pipe are arranged in order that the gap of the joint (referential numeral 11 in FIG. 4B) between the edges is as small as possible.

An object to be heated by the jacket heater 10 according to the second embodiment is supposed to be a pipe, and the jacket heater 10 has a cylindrical shape in order to fit with the contours of the pipe. By making the jacket heater 10 to be a cylindrical shape, when it is placed in the state shown in FIG. 4B, the gap at the joint 11 portion can be reduced and the effect of keeping warm an object further increases.

Thus, in the case where the jacket heater 10 is placed in the state shown in FIG. 4B, in order to reduce the gap at the joint 11 portion, of the length in the direction perpendicular to the longitudinal direction of the jacket heater 10 according to the second embodiment, the length on the opposite side facing an object (length A in FIG. 1, if explained with FIG. 1) may be longer than the length on the side facing an object (length B in FIG. 1, if explained with FIG. 1).

By this, it can be controlled that the edges fitting closely to each other at the joint 11 portion along the length direction of the pipe open as they leave the object, and the jacket heater can be placed without a gap at the joint 11 portion. As a result, the effect of keeping warm an object increases.

Further, the first to the seventh variations explained in the first embodiment can be applied to the jacket heater according to the second embodiment. Namely, as shown in the second variation and the fourth variation of the first embodiment, a constitution that a substrate which supports the electric heater wire 20, or a metal thin film is included between the electric heater wire 20 and the first shaped body 30B may be employed.

EXPLANATION OF REFERENTIAL NUMERALS

10 Jacket heater
11 Joint
20 Heating element
30 Outer covering member
30A Second shaped body
30B First shaped body
40 Substrate
50 Thin film
200 Object (to be heated)
300 Pore

The invention claimed is:

1. A jacket heater placed in adjacent to an object to be heated so as to heat and keep warm said object, the jacket heater comprising:
   an electric heater wire configured to be a heating element, and
   an outer covering member configured to comprise a first shaped body and a second shaped body which are formed in different thicknesses,
   wherein the first shaped body is provided on a side thereof facing and contacting the object,
   the second shaped body is provided on a side opposite from said side facing the object,
   the second shaped body is a resin shaped body that has a porous structure,
   the second shaped body has a relatively larger thickness than the first shaped body
   the electric heater wire is accommodated between the first shaped body and the second shaped body which are joined each other such that the outer covering member envelops the electric heater wire,
   the jacket heater is configured to be able to deform its shape to conform to contours of the object, and
   the second shaped body has a plurality of pores that are formed by stretching a resin shaped body.

2. The jacket heater according to claim 1, wherein the thickness of the second shaped body is 1 mm or more and 20 mm or less.

3. A jacket heater placed in adjacent to an object to be heated so as to heat and keep warm said object, the jacket heater comprising:
   an electric heater wire configured to be a heating element, and
   an outer covering member configured to comprise a first shaped body and a second shaped body which are formed in different thicknesses,
   wherein the first shaped body is provided on a side thereof facing and contacting the object,
   the second shaped body is provided on a side opposite from said side facing the object,
   the second shaped body is a resin shaped body that has a porous structure,
   the second shaped body has a relatively larger thickness than the first shaped body,
   the electric heater wire is accommodated between the first shaped body and the second shaped body which are joined each other such that the outer covering member envelops the electric heater wire,
   the jacket heater is configured to be able to deform its shape to conform to contours of the object, and
   the porosity of the second shaped body is 60 to 90%.

4. The jacket heater according to claim 1, wherein the pore diameter of the second shaped body is 200 µm or less.

5. The jacket heater according to claim 1, wherein the second shaped body has a plurality of pores that are formed by stretching a resin shaped body with heating.

6. The jacket heater according to claim 1, wherein the first shaped body is a resin shaped body that has a solid structure.

7. A jacket heater placed in adjacent to an object to be heated so as to heat and keep warm said object, the jacket heater comprising:
   an electric heater wire configured to be a heating element, and
   an outer covering member configured to comprise a first shaped body and a second shaped body which are formed in different thicknesses,
   wherein the first shaped body is provided on a side thereof facing and contacting the object,
   the second shaped body is provided on a side opposite from said side facing the object,
   the second shaped body is a resin shaped body that has a porous structure,
   the second shaped body has a relatively larger thickness than the first shaped body,
   the electric heater wire is accommodated between the first shaped body and the second shaped body which are joined each other such that the outer covering member envelops the electric heater wire,
   the jacket heater is configured to be able to deform its shape to conform to contours of the object, and
   the thickness of the first shaped body is 0.1 mm or more and 3 mm or less.

8. The jacket heater according to claim 1, wherein, when the heater jacket is conformed to the object and when heat is applied, the pores of the second shaped body reduce in diameter, the second shaped body retains a shaped conformed to the object.

* * * * *